(12) United States Patent
Hilerio et al.

(10) Patent No.: US 7,680,683 B2
(45) Date of Patent: Mar. 16, 2010

(54) DYNAMICALLY REPOSITIONING WORKFLOW BY END USERS

(75) Inventors: Israel Hilerio, Kenmore, WA (US); Andres Sanabria, Sammamish, WA (US); Constantin Mihai, Bellevue, WA (US); Nikhil Kothari, Sammamish, WA (US); Pravin Indurkar, Sammamish, WA (US); Marcelo R. Uemura, Seattle, WA (US); Michael Harder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 11/321,777

(22) Filed: Dec. 29, 2005

(65) Prior Publication Data

US 2007/0156888 A1    Jul. 5, 2007

(51) Int. Cl.
*G06F 9/46* (2006.01)
(52) U.S. Cl. .......................................................... 705/8
(58) Field of Classification Search ....................... 705/8
See application file for complete search history.

(56) References Cited

U.S. PATENT DOCUMENTS

| | | | |
|---|---|---|---|
| 5,490,097 A | 2/1996 | Swenson et al. | |
| 5,960,404 A | 9/1999 | Chaar et al. | |
| 6,108,711 A | 8/2000 | Beck et al. | |
| 6,253,369 B1 | 6/2001 | Cloud et al. | |
| 6,272,672 B1 | 8/2001 | Conway | |
| 6,282,531 B1 | 8/2001 | Haughton et al. | |
| 6,308,224 B1 | 10/2001 | Leymann et al. | |
| 6,339,838 B1 | 1/2002 | Weinman, Jr. | |
| 6,397,191 B1 * | 5/2002 | Notani et al. | 705/9 |
| 6,442,528 B1 | 8/2002 | Notani et al. | |
| 6,473,794 B1 * | 10/2002 | Guheen et al. | 709/223 |
| 6,499,023 B1 * | 12/2002 | Dong et al. | 706/46 |
| 6,675,133 B2 | 1/2004 | Knowles et al. | |
| 6,697,784 B2 | 2/2004 | Bacon et al. | |
| 6,769,113 B1 | 7/2004 | Bloom et al. | |
| 6,772,407 B1 | 8/2004 | Leymann et al. | |
| 6,801,227 B2 | 10/2004 | Bocionek et al. | |
| 6,820,118 B1 | 11/2004 | Leymann et al. | |

(Continued)

FOREIGN PATENT DOCUMENTS

GB    2 396 928    7/2004

(Continued)

OTHER PUBLICATIONS

The Workflow Management Coalition—The Workflow Reference Model, Document TC00-1003, Hollingsworth, David, Jan. 19, 1995. pp. 1-55.*

(Continued)

*Primary Examiner*—Romain Jeanty
*Assistant Examiner*—Luis Santiago
(74) *Attorney, Agent, or Firm*—Workman Nydegger

(57) ABSTRACT

Systems and methods that dynamically reset a workflow state by employing a dynamic state manager that is external to the workflow, and enables interaction of a host with a workflow instance. An event driven workflow or state machine workflow can be supplied, wherein ad hoc events are employed to reset and manipulate the workflow to states that have not been modeled as part of the workflow itself, to dynamically create relation ships at runtime.

8 Claims, 9 Drawing Sheets

U.S. PATENT DOCUMENTS

| | | | |
|---|---|---|---|
| 6,839,062 | B2 | 1/2005 | Aronson et al. |
| 6,854,016 | B1 | 2/2005 | Kraenzel et al. |
| 6,877,153 | B2 | 4/2005 | Konnersman |
| 6,968,503 | B1 | 11/2005 | Chang et al. |
| 7,120,800 | B2 | 10/2006 | Ginter et al. |
| 2002/0016810 | A1 | 2/2002 | Watanabe |
| 2002/0065701 | A1 | 5/2002 | Kim et al. |
| 2003/0004770 | A1 | 1/2003 | Miller et al. |
| 2003/0004771 | A1 | 1/2003 | Yaung |
| 2003/0023622 | A1 | 1/2003 | Obermeyer et al. |
| 2003/0078975 | A1 | 4/2003 | Ouchi et al. |
| 2003/0090514 | A1 | 5/2003 | Cole et al. |
| 2003/0181991 | A1 | 9/2003 | Chau et al. |
| 2004/0015841 | A1 | 1/2004 | Lepejian et al. |
| 2004/0046789 | A1 | 3/2004 | Inanoria |
| 2004/0103014 | A1* | 5/2004 | Teegan et al. ............ 705/8 |
| 2004/0117795 | A1 | 6/2004 | Wang et al. |
| 2004/0122853 | A1 | 6/2004 | Moore |
| 2004/0138939 | A1 | 7/2004 | Theiler |
| 2004/0199614 | A1 | 10/2004 | Shenfield et al. |
| 2004/0201604 | A1 | 10/2004 | Kraenzel et al. |
| 2004/0268338 | A1 | 12/2004 | Gurpinar et al. |
| 2005/0015711 | A1 | 1/2005 | Yamamoto et al. |
| 2005/0044173 | A1 | 2/2005 | Olander et al. |
| 2005/0066287 | A1 | 3/2005 | Tattrie et al. |
| 2005/0149908 | A1 | 7/2005 | Klianev |
| 2005/0203757 | A1 | 9/2005 | Lei et al. |
| 2005/0234902 | A1 | 10/2005 | Meredith et al. |

FOREIGN PATENT DOCUMENTS

| | | |
|---|---|---|
| KR | 1020010063810 | 7/2001 |
| WO | WO 02/21314 A2 | 3/2002 |
| WO | WO 2004/055633 A2 | 7/2004 |

OTHER PUBLICATIONS

Angus, Jeff; "Jet Form's universally deployable workflow", 1998, Information week, Iss. 679, p. 104, Pro Quest ID 29161881.*

M2 Press wire, "Team WARE: Team WARE Flow 2.0 chosen as product of choice for collaborative & ad-hoc workflow apps", Jan. 1998, Coventry, p. 1, Pro Quest ID 25682717.*

OA Dated Sep. 22, 2008 for U.S. Appl. No. 11/321,490, 32 pages.

U.S. Appl. No. 11/321,789, filed Dec. 29, 2005, Sanabria, et al.

U.S. Appl. No. 11/321,490, filed Dec. 29, 2005, Sanabria, et al.

U.S. Appl. No. 11/321,820, filed Dec. 29, 2005, Sanabria, et al.

Muth, et al., "From Centralized Workflow Specification to Distributed Workflow Execution" Journal of Intelligent Information Systems, Mar. 1998, vol. 10, No. 2, pp. 159-184, Abstract, 2 pages.

Kappel, et al., "A Framework for Workflow Management Systems Based on Objects, Rules and Roles", 2000, 5 pages.

Moldt, et al., "Pattern Based Workflow Design Using Reference Nets", Lecture Notes in Computer Science, Business Process Management: International Conference, BPM 2003, Jun. 26-27, 2003, pp. 246-260, Abstract, 2 pages.

D. Manolescu, "An Extensible Workflow Architecture with Objects and Patterns", Chapter 4 in Technology of Object-Oriented Languages, Systems, and Architectures, Theo D'Hondt, editor., 2003, 12 pages, Kluwer Academic Publishers.

Leymann, et al., "Workflow-based applications", IBM Systems Journal, 1997, vol. 36, No. 1, pp. 102-123.

Huang, et al., "Unified enterprise modeling and integration environment based on Workflow technology", Proceedings of the Third International Conference (ICeCE2003), Oct. 2003, pp. 1000-1003.

Lond, et al., "Accommodating Change in Enterprise Applications", Thesis, IT-University of Copenhagen, 2002, 110 pages.

Vossen, et al., "The WASA2 Object-Oriented Workflow Management System", SIGMOD '99, Philadelphia PA, 1999, pp. 587-589.

Manolescu, et al., "Dynamic Object Model and Adaptive Workflow", OOPSLA Workshop on Metadata and Active Object Models, 1999, 19 pages.

Chen, et al., "Multi-Agent Cooperation, Dynamic Workflow and XML for E-Commerce Automation", HP Labs Technical Report, HPL-1999-136, Oct. 1999, 10 pages, Software Technology Laboratory, Palo Alto, CA.

Ader, et al., "WooRKS, an Object Oriented Workflow System for Offices" IEEE Bulletin of the Technical Committee on Data Engineering, Mar. 1995, 81 pages, vol. 18, No. 1.

Kim, et al., "WW-Flow: Web based workflow management with runtime encapsulation" IEEE Internet Computing, May-Jun. 2000, pp. 55-64, vol. 4, No. 3.

Miller, et al., "WebWork: METEOR2's Web-based Workflow Management System", Journal of Intelligent Information Systems, Special Issue Workflow Management Systems, Mar.-Apr. 1998, pp. 185-215, vol. 10, No. 2.

"Windows Workflow Foundation" accessible at: http://msdn.microsoft.com/windowsvista/building/workflow/default.aspx, last accessed: Nov. 16, 2005, 4 pages.

International Search Report mailed Jun. 8, 2007, for PCT Application Serial No. PCT/US2006/047220, 8 Pages.

* cited by examiner

DYNAMICALLY REPOSITIONING WORKFLOW BY END USERS

BACKGROUND

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. Today, a computing system interfaced to the Internet, via wire or wireless technology, can provide a user with a channel for nearly instantaneous access to a wealth of information from a repository of web sites and servers located around the world, at the user's fingertips.

For example, in such "worldwide web" network, a user is able to designate an address of a site or target page where the user desires to "go". The user then enters the selected site and the target page or site home page will be displayed on the user's display screen. Typically, the information available via web sites and servers is accessed via a web browser executing on a web client (e.g., a computer). For example, a web user can deploy a web browser and access a web site by entering the web site Uniform Resource Locator (URL) (e.g., a web address and/or an Internet address) into an address bar of the web browser and pressing the enter key on a keyboard or clicking a "go" button with a mouse. In many cases, when the target screen is displayed, it may not present the anticipated or sought after information and the user will then have to designate another target address for access.

Processes involved in page navigation can be automated, relying on communication among applications, while others rely on people to initiate the process, approve documents the process uses, resolve any exceptional situations that arise, and more. In either case, it is common to specify a discrete series of steps known as a workflow (e.g., page flow control) that describes the activities of the users and software involved in the process. Once such workflow has been defined, an application can be built around that definition to support the business process.

Computer systems and associated software now provide tools with which businesses and other organizations can improve their workflow. Software tools can be used to model business workflow processes or schedules and identify inefficiencies and possible improvements. In addition, where a process involves exchanging data between people, departments, plants, or even between separate companies, computer systems and networks can be used to implement such exchanges. Such systems and software tools are further able to implement large-scale computations and other data or information processing that are typically associated with business related information.

Accordingly, workflow management includes the effective management of information flow and control in an organization's business processes, wherein automation of such information processing has led to many efficiency improvements in the modern business world. Moreover, such automation of workflow management is now allowing businesses and other organizations to further improve performance by executing workflow transactions in computer systems, including global computer networks, such as the Internet.

A typical workflow-based application often requires a plurality of conditions to be satisfied. For example, one such condition is the ability to make decisions based on business rules. Such can include simple rules, (e.g., like as a yes-or-no decision based on the result of a credit check), and more complex rules, (e.g., the potentially large set that must be evaluated to make an initial underwriting decision.) Another requirement is communication with other software and other systems outside the workflow. For example, an initial request can be received from one part of the application, while some aspects, (e.g., contacting a credit service) can require communication using other web services or technologies. A further condition to be satisfied is the proper interaction of the workflow with users. For example, the workflow should typically be able to display a user interface itself or interact with human beings through other software. Moreover, the ability to maintain state throughout the workflow's lifetime is another condition that needs to be satisfied. Accordingly, creating and executing a workflow in software poses unique challenges.

Today there are a plurality of solutions for incorporating workflow systems with page flow control. Such can include ones that employ Model View Controller (MVC), Page Controller, and Front Controller patterns, to orchestrate web page navigation, for example. These solutions allow users to navigate through a series of predefined pages with hard-coded relationships. Nonetheless, submitting pages that have already being processed requires the relationships to be defined ahead of time.

Accordingly, it can become challenging to model all possible combination of relationships between any set of pages. Such complexity forces developers and analysts to model the relationship between pages that is most common and likely to happen, e.g., the "happy path". Thus, developers can be forced to build re-submit logic inside their pages that needs to keep track of the last page submitted. In general, no mechanism exist to enable definition of page flow, wherein end users are capable of repositioning the flow without a formal relationship between pages being defined.

Therefore, there is a need to overcome the aforementioned exemplary deficiencies associated with conventional systems and devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that dynamically reset a workflow state by employing a dynamic state manager that is external to the workflow, and enables interaction of a host with a workflow instance. Such dynamic state manger can manage the state of the workflow from outside of the workflow (e.g., without being built as part of the workflow itself). As such, a requirement to model ad hoc state changes of a workflow is mitigated. Thus, an event driven workflow can be supplied, wherein ad hoc events are employed to reset and manipulate the workflow to states that have not been modeled as part of the workflow itself, to dynamically create relation ships at runtime. A host can call the workflow provider and passes a set state (e.g., with a specific state and UI), wherein the workflow runtime then is picked up. The dynamic state manager receives the set state, to drive such state by resetting the workflow instance. The workflow state can also send a notification to the workflow runtime regarding suspension (e.g., awaiting an event), which returns to the workflow provider and is then communicated to the host.

In a related aspect an interactive activity component can stop the workflow at specific points (e.g., setting the workflow run time to idle), and await an input from the host to resume the workflow. The host can call a workflow provider for loading a workflow instance. Subsequently an event can be set, wherein the event can correspond to a user interface (e.g., a web page that corresponds to a state of the workflow). Thus, the host can supply information regarding navigation paths (e.g., in form of a "go-to").

Next, a check can be provided by the dynamic state manager as to the availability of a state for the workflow. If such state does not exist, an error can be displayed to the user. Otherwise, and if such state exists, the dynamic state manager can set such state to active for an execution thereof within the workflow. Subsequently and upon execution, the workflow can wait for the event to transition to new state, and upon receipt of the transition event from the host, the workflow can move to the new state. Next, verification is performed to check whether such state is the last state in the workflow instance. If so, the methodology ends. Otherwise, the methodology returns to executing another state. It is to be appreciated that the subject innovation is not so limited, and in addition to web pages the subject innovation can be applied to web services, system services execution, and the like.

In accordance with a particular method of the subject innovation, initially a display, (e.g., a page) that is part of an application navigation control (e.g., a page flow control flow) is displayed in the browser, wherein the user completes the information on the page for a submission thereof. Subsequently, the workflow instance associated with such display is loaded and the state of the workflow is set to the state associated with the display. Typically, there exists a one to one association between the display and a state. Once the state is set, the event generated by the display is passed to the workflow instance for consumption. Events are passed to the current state of the workflow instance. The state determines if such event can be consumed. If the event is consumed by the current state, an associated handler can determine if state transitions are required. Otherwise and if the event is not consumed by the current state, such event is then passed to the state containing that state for consumption.

To the accomplishment of the foregoing and related ends, certain illustrative aspects of the claimed subject matter are described herein in connection with the following description and the annexed drawings. These aspects are indicative of various ways in which the subject matter can be practiced, all of which are intended to be within the scope of the claimed subject matter. Other advantages and novel features may become apparent from the following detailed description when considered in conjunction with the drawings.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system", "service", "manager" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
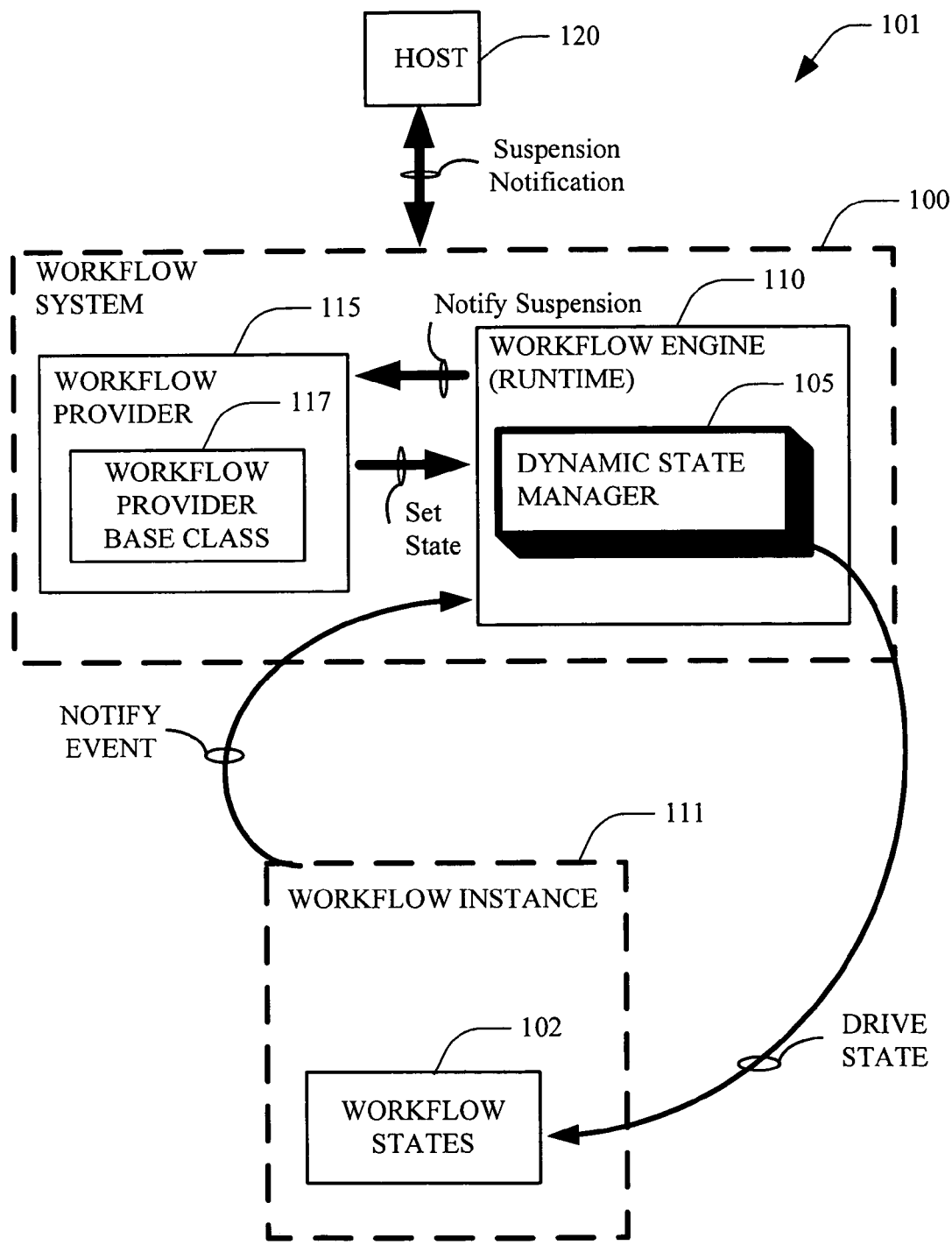
FIG. 1 illustrates an exemplary system diagram of a workflow having a dynamic state manager that resets a workflow state.

Turning initially to FIG. 1, a block diagram for a system 101 is illustrated, which dynamically resets a workflow state(s) 102 by employing a dynamic state manager 105 that is external to the workflow, and enables interaction of a host 120 with the workflow instance 102. The system 101 employs the dynamic state manager 105 to mitigate a requirement to model ad hoc state changes of a workflow associated with the system 101. Thus, an event driven workflow can be supplied, wherein ad hoc events are employed to reset and manipulate the workflow to states that have not been modeled as part of the workflow itself, and to dynamically create relationships at runtime.

Such workflow can model a human or system process that is defined as a map of activities. An activity is a step in a workflow, and is the unit of execution, re-use, and composition for a workflow. The map of activities expresses rules, actions, states, and their relation. Typically, the workflow runs via the workflow engine/runtime 110, and the workflow runtime requires an external application to host it, according to a few rules, as depicted by the host 120. Data exchange between the host 120 and the workflow system 100 can pertain to and/or describe the business documents and other objects that are employed for or that facilitate work flow activity or a flow between the local variables of the workflow that are used to communicated data with the host application 120.

For example, the host application 120 can interact with Workflow Provider 115 associated with the workflow system 100, through a Workflow Provider Base Class 117. In addition, the host 120 can be responsible for a number of additional and critical aspects, such as the creation of one or more processes, marshaling of calls between various components as needed for proper execution of the workflow; and setup of isolation mechanisms. Moreover, the host 120 can create multiple processes to take advantage of multiple Central Processing Units (CPUs) in a machine for scalability reasons, or to run a large number of workflow instances on a farm of machines. The host 120 can further control the policies to apply when a workflow is subject to a long wait, listen for specific events and communicate them to a user or administrator, set timeouts and retries for each workflow, expose performance counters, and write log information for debugging and diagnostic purposes.

A workflow associated with the workflow system 101 can communicate with the outside world through a service established specifically for that purpose, wherein such service can raise events that event-driven activities inside the workflow will hook up. Likewise, the service exposes public methods for the workflow to call and send data to the host 120. The Workflow can be defined in the form of a schedule for execution in a computer system. A schedule can include a set of actions having a specified concurrency, dependency, and transaction attributes associated therewith. Each schedule can have an associated schedule state, which includes a definition of the schedule, the current location within the schedule, as well as active or live data and objects associated with the schedule. Within a schedule, transaction boundaries can exist based on groupings of actions. In this regard, a transaction can encompass individual actions, or transactions, or groups thereof. As discussed further hereinafter, actions can be grouped into sequences, which are executed in serial fashion, as well as tasks in which the actions are executed concurrently. Based on the groupings, therefore, concurrency attributes can be resolved for the actions and transactions within a schedule.

The host 120 can call the workflow provider 115 and pass a set state (e.g., with a specific state and UI), wherein the workflow runtime is then picked up. The dynamic state manager 105 receives the set state, to drive such state by resetting the workflow instance 111. The workflow state 102 can also send a notification to the workflow runtime 110 regarding suspension (e.g., awaiting an event), which is directed to the workflow provider 115 and is then communicated to the host 120.

The following is an exemplary definition for a dynamic state manager wherein it is assumed that each State inside the State Machine Workflow maps to a Web Page.

```
//Retrieve information from the page to send to the
workflow
Data pageInfo = Page.GetFormData( );
//Retrieve the name associated with the page.
String pageAlias = Page.GetCurrentPageAlias( );
//Retrieves the workflow instance of the state machine
workflow
StateMachineWorkflow StateMachineInstance =
WorkflowRuntime.GetWorkflow(workflowID);
//Retrieves the current state of the state machine
State currentState =
StateMachineInstance.GetCurrentState( );
//If the current state of the statemachine doesn't match
the page name
//then we need to reset the state, otherwise, continue
and submit the page
//to the current state.
If (currentState.Name != pageAlias)
{
    StateMachineWorkflow.SetState(pageName);
}
StateMachineWorkflow.Submit(pageInfo);
//Waits for the state transition to take place before it
updates the page
State nextState = StateMachine.GetCurrentState( );
//Retrieves the mapping between the state of the workflow
and the page.
//Remember there is a one to one mapping.
String nextPage = Page.LookUpAlias(nextState.Name);
Page.DisplayPage(nextPage);
```

Figure 2:
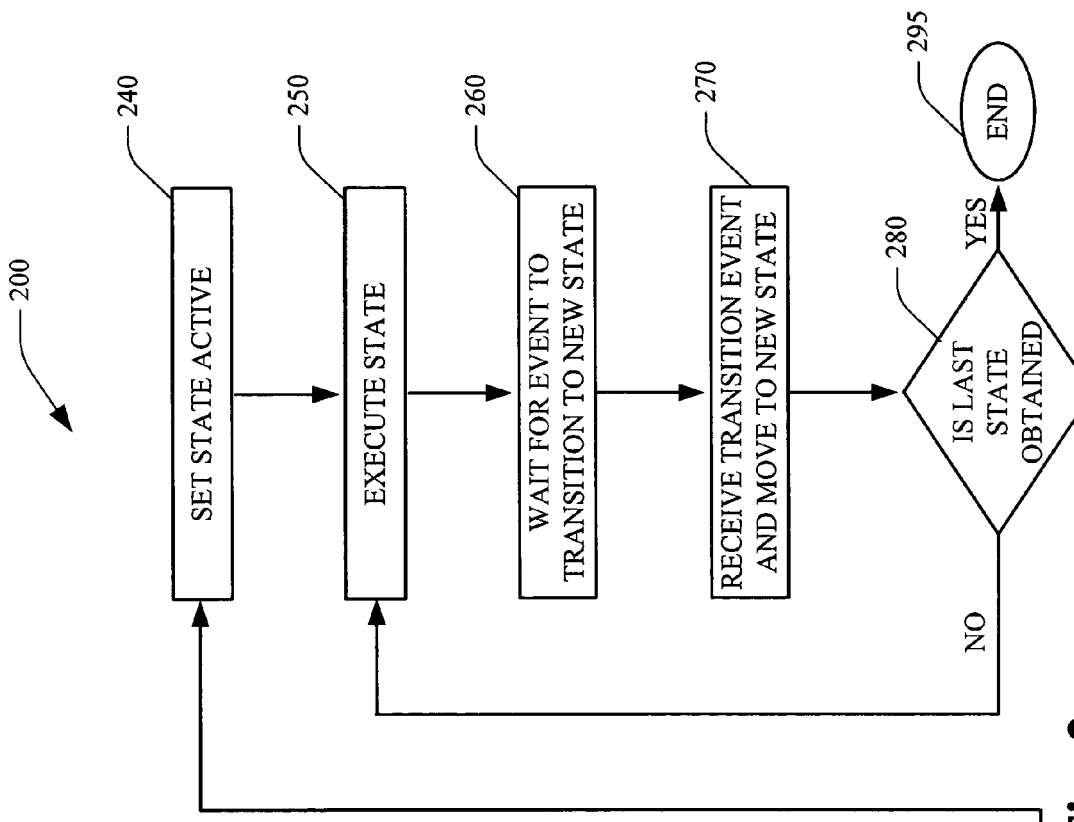
FIG. 2 illustrates an exemplary methodology for resetting a workflow state according to an exemplary aspect of the subject innovation.
Figure 2:
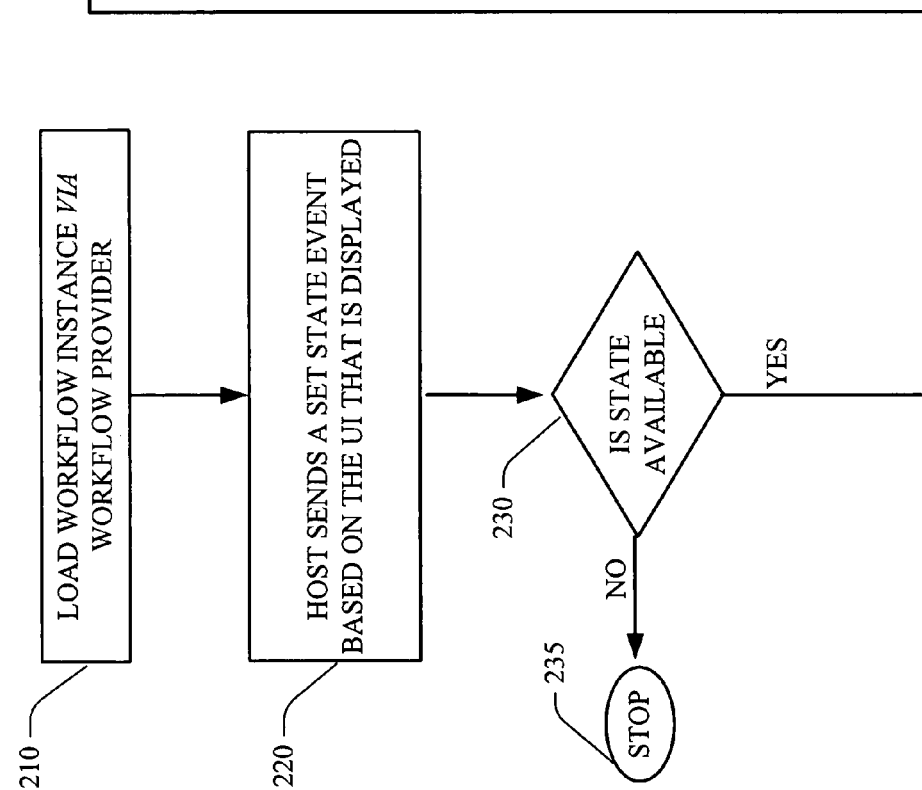

FIG. 2 illustrates a methodology 200 in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. At 210, the host can call a workflow provider for loading a workflow instance. For example, to load an instance of the workflow, access can be provided to a corresponding persistence store that stores workflow instance representation, and such representation is then converted to workflow instances, and provided to the host application. Subsequently, and at 220 an event can be set, wherein the event can correspond to a user interface (e.g., a web page that corresponds to a state of the workflow). Thus, the host can supply information regarding navigation paths (e.g., in form of a "go-to"). Next and at 230, the dynamic state manager can check the availability of a state for the workflow. If such state does not exist an error can be displayed to the user, and the methodology stops at 235.

Otherwise, and if such state exists, the dynamic state manager can set such state to active at 240 for an execution thereof within the workflow. Subsequently and upon execution at 250, the workflow can wait for the event to transition to new state 260, and upon receipt of the transition event from the host, the workflow can move to the new state at 270. Next and at 280, verification is performed to check whether such state is the last state in the workflow instance. If so, the methodology ends at 295. Otherwise, the methodology returns to act 250 for executing another state.

Figure 3:
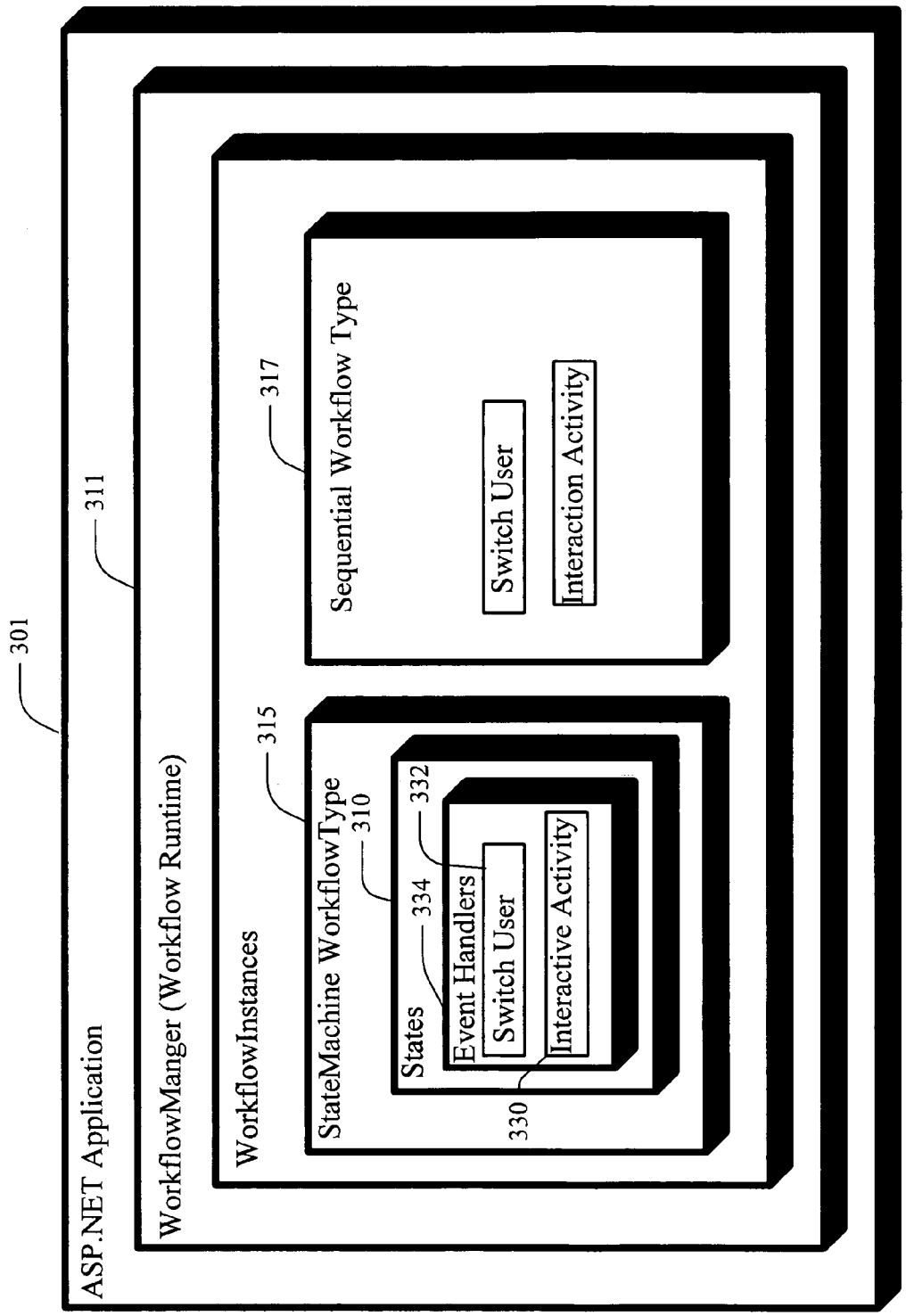
FIG. 3 illustrates a particular system diagram of an Active Server Pages (ASP) web development technology in accordance with an aspect of the subject innovation.
Figure 4:
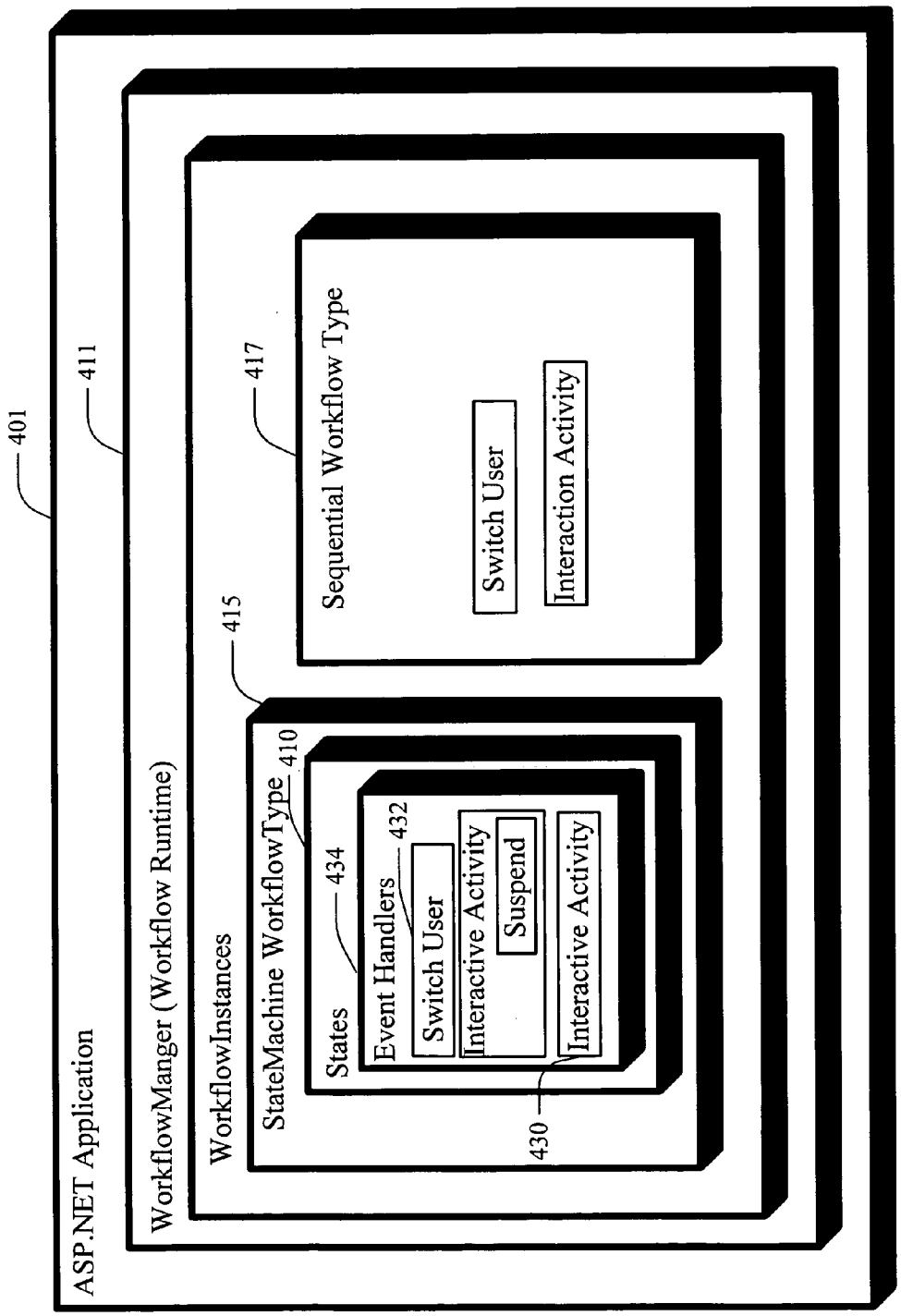
FIG. 4 illustrates a further system diagram of an ASP web development technology according to a further aspect of the subject innovation.

FIGS. 3 & 4 illustrate particular implementation examples 300 & 400 of the dynamic state manager according to according to an aspect of the subject innovation. In contrast to conventional systems (wherein users have to interact with workflow type system that define page navigation via modeling of a complex logic among various pages/steps)—the subject innovation enables a dynamic concept for state management that simplifies the logic involved. For example, the states 310, 410 of the workflow can be reset before information for the event is processed by the workflow.

As illustrated in FIGS. 3 & 4 there exists two versions of the workflow, namely a state machine workflow type 315, 415 and a sequential workflow type 317, 417. Typically, every workflow contains some number of activities, each of which performs some aspect of that workflow's function. The workflow acts as a container for these activities, providing a way to control their lifecycles and order of execution. System workflows tend to execute activities in well defined, predictable ways, while human workflows do not.

To address both of these requirements, Windows Workflow Foundation provides two built-in workflow types: sequential workflows 317, 417, capable of executing activities in a predefined pattern, and state machine workflows 315, 415, capable of responding to external events as they occur. Both rely on the same runtime environment, and both can use the same custom activities. The sequential approach is a natural fit for system workflow, while state machines provide a way to model the more loosely defined nature of human workflow. A single workflow can combine elements of both styles, allowing a combination of the two. Moreover, a developer can also create custom workflow types.

The workflow runtime 311, 411 manages the workflow instance programmatically as a workflow runtime inside the Active Server Pages (ASP.net application) 301, 401. Moreover, the interactive activity component 330, 430 can stop execution of the workflow at specific points (e.g., setting the workflow run time to idle), and await an input from the host to resume the workflow. The host (e.g., web page) can send an event to move the workflow to another state. For example, the host can fire a resume event to resume the workflow, to a next state. FIG. 4 further illustrates an interactive activity component being broken up into a resume and suspend in the state machine 450.

The interactive activity component 330, 440 can supply user input and associated interaction to the workflow during various interactivity breaks that request such user input. This enables a controlled/synchronous data exchange between the workflow and a host application that is associated with the workflow. Thus, at defined times within an execution of the workflow, user context can be associated with a workflow instance. Moreover, the workflow can drive the User Interface (UI) based on the state of the workflow during suspension, via the switch user component 332, 432, such as information relating to the user of the workflow. Moreover, event handlers 334, 434 can consume events that are not processed by current state, to enable the current control flow that is defined on a state to be overridden. Accordingly, the state of workflow can be managed from outside of the workflow (e.g., without being built as part of the workflow itself), and a requirement to model ad hoc state changes of a workflow is mitigated.

Figure 5:
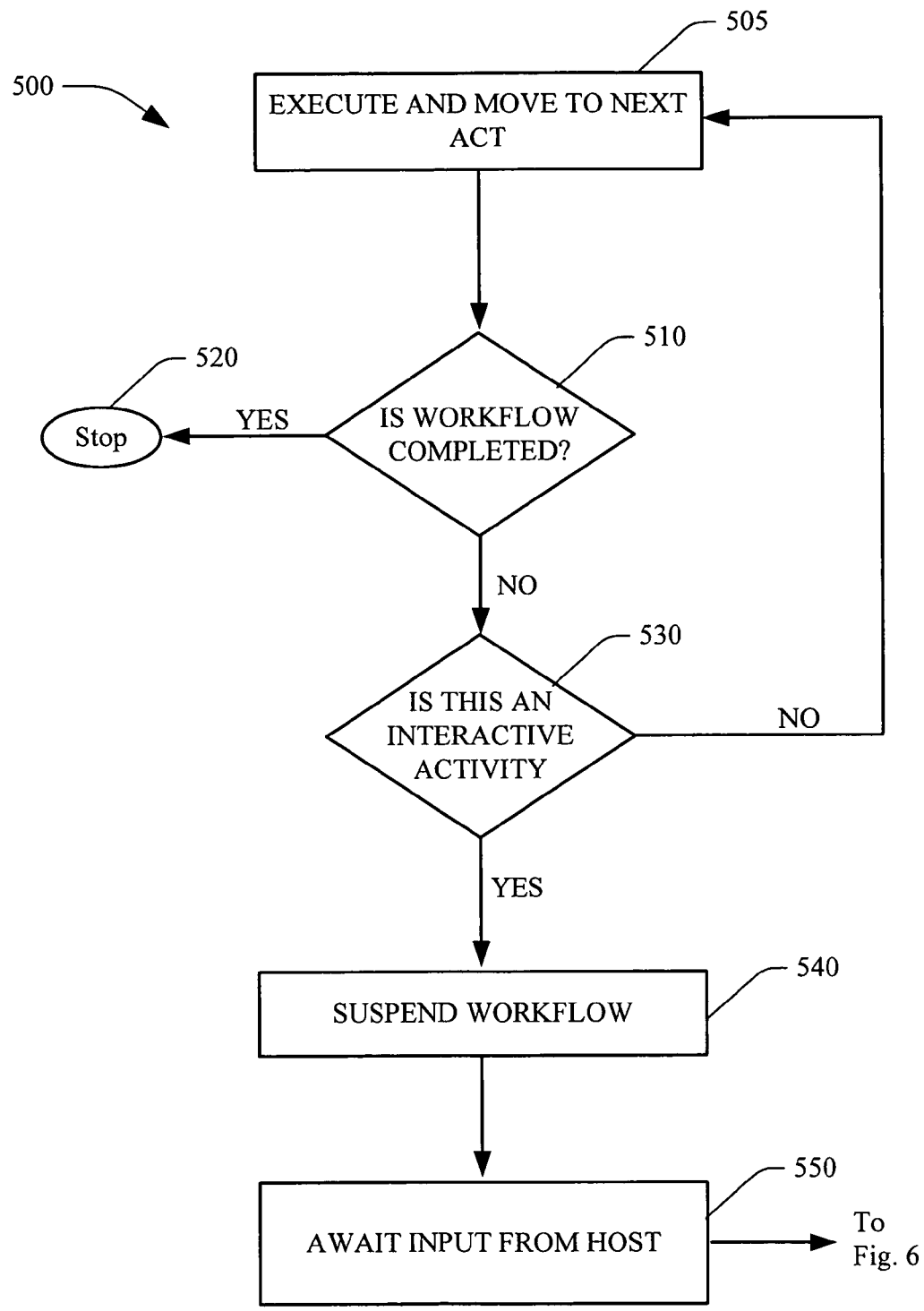
FIG. 5 illustrates an exemplary methodology, wherein an interactive workflow is supplied that awaits an input from the host to move the workflow to another state.
Figure 6:
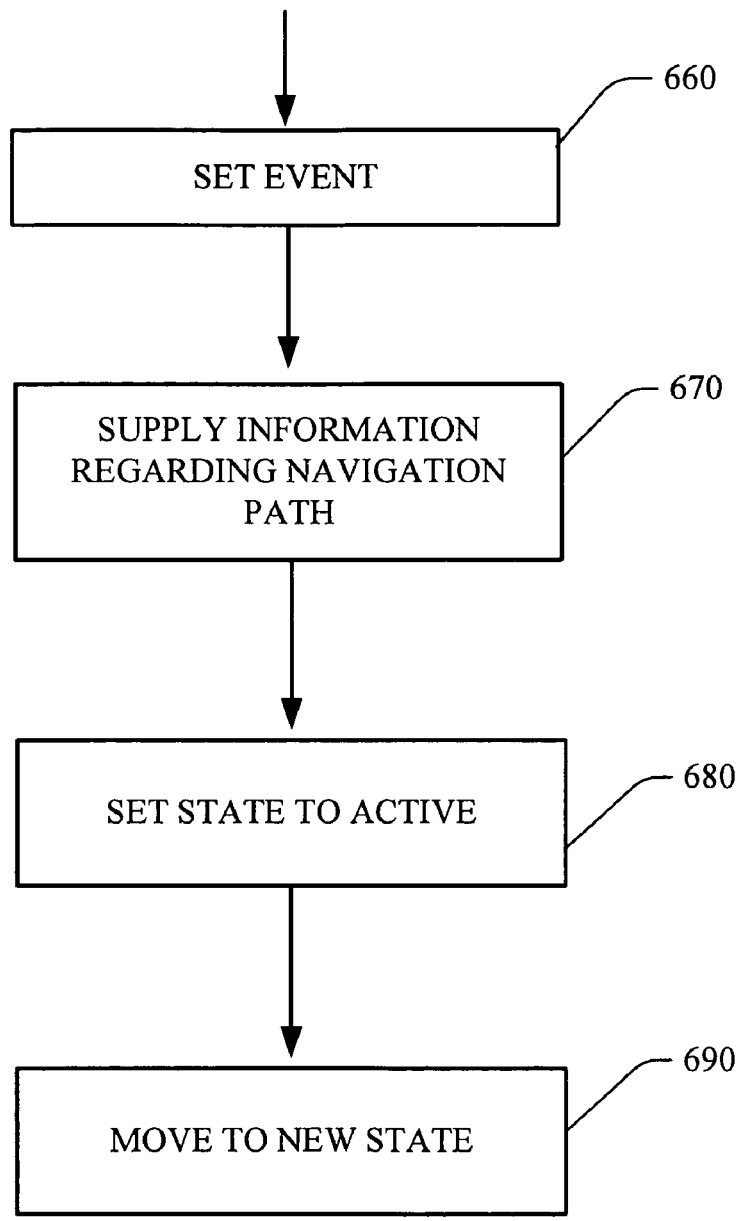
FIG. 6 illustrates a further methodology of resetting a state of the workflow.

FIGS. 5 & 6 illustrate exemplary flowcharts, wherein an interactive workflow is supplied that executes up to particular points, and awaits an input from the host to resume the workflow, wherein such event can move the workflow to another state. As illustrated in the methodology 500, the workflow process executes at 505 and moves to the next act in the process. The workflow execution can verify at 510 whether the act to be executed signifies an end of the workflow. If so the execution of the workflow ends at 520. Otherwise, the methodology proceeds to act 530 wherein the act to be executed by the workflow is checked to verify whether it is an interactive activity. If so, the workflow is suspended at 540, to enable interaction with a host application for dynamically resetting a state of the workflow as described in detail supra. Otherwise, the methodology returns to act 505, wherein the workflow executes the current act and proceeds to the next one.

As illustrated in FIG. 5 and subsequent to the suspension of the workflow at 540, the execution flow awaits an input from the host at 550 to resume the workflow, wherein such event can move the workflow to another state. Subsequently, and at 660 of FIG. 6 an event can be set, wherein the event can correspond to a user interface (e.g., a web page) that corresponds to a state of the workflow, assuming such state actually exists. Thus, the host can supply information regarding navigation paths, at 670 in the form of a "go-to", for example. As such, the dynamic state manager can set such state to active at 680 for an execution thereof within the workflow. Subsequently and upon execution, the workflow can wait for the event to transition to new state, and upon receipt of the transition event from the host, the workflow can move to the new state at 690. Thus, the state of the workflow can be managed from outside of the workflow (e.g., without being built as part of the workflow itself), and a requirement to model ad hoc state changes of a workflow is mitigated.

Figure 7:
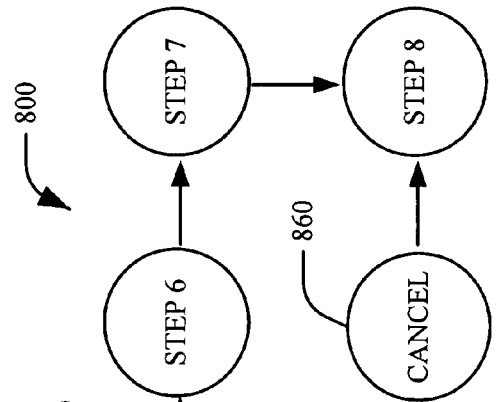
FIG. 7 illustrates a chart of steps related to an event driven workflow in accordance with an aspect of the subject innovation.
Figure 8:
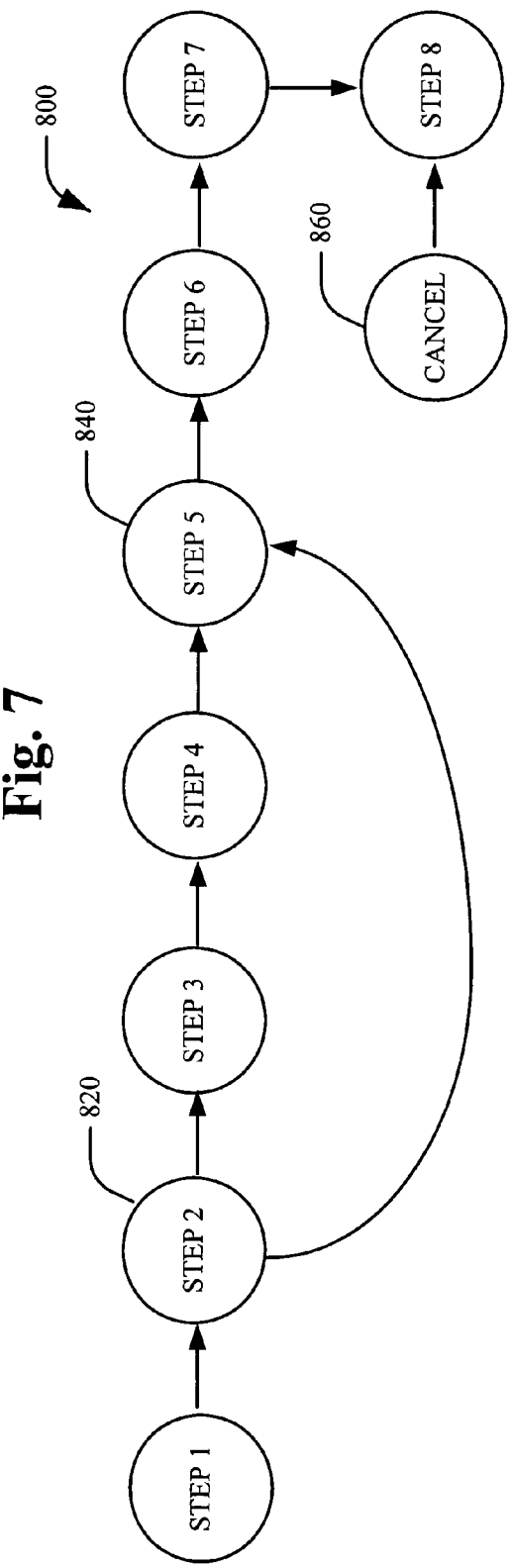
FIG. 8 illustrates a sequence of acts employed to reset and manipulate the workflow to states that have not been modeled as part of the workflow itself.

FIGS. 7 & 8 illustrates an example of an event driven workflow, wherein ad hoc events are employed to reset and manipulate the workflow to states that have not been modeled as part of the workflow itself, to dynamically create relation ships at runtime. A Webpage application can call the workflow provider and passes a set state (e.g., with a specific state and UI), wherein the workflow runtime is then picked up. The dynamic state manager can receives the set state, to drive such state by resetting the workflow instance. Initially a page that is part of a page flow control flow is displayed in the browser, wherein the user completes the information on the page for a submission thereof. Subsequently, the workflow instance associated with such page is loaded and the state of the workflow is set to the state associated with the page. Typically, there exists a one to one association between the page and a state. Once the state is set, the event generated by the page is passed to the workflow instance for consumption. Events are passed to the current state of the workflow instance. The state determines if it can consume this event. If the event is consumed by the current state, an associated handler can determine if state transitions are required. Otherwise and if the event is not consumed by the current state, such event is then passed to the state containing that state for consumption.

For example, in a scenario of purchasing a phone with selected features, a developer can develop a workflow application that requires users to enter information using web pages. The web pages have been previously defined and are mapped to states in a State Machine workflow. The goal of the developer is to model the control flow of the application using a State Machine workflow. The events defined in the page can be modeled as inputs in a state. Based on the type of events, the State Machine can change states and execute until completion. The change of states in the State Machine will define the control flow of the page flow application.

Before an event is submitted from the page to the workflow, the current state of the State Machine workflow can be positioned to the state associated to the page being displayed. Such enables an event to be manipulated as if the user was on the happy path and expected to be on that page. Thus, a dynamic relationship can be created (via the re-positioning) between the last set state of the workflow and the newly selected state of the workflow. The steps for purchasing a cell phone are illustrated in chart 700 of FIG. 7. It is to be appreciated that if one is operating on a page that maps to a current state of the state machine workflow, then there typically is no need to change or reposition the state. In general, the state is only reset if the page and the current state do not match.

Referring now to FIG. 8, a sequence 800 is illustrated, wherein an end user can submit steps 1, 2, 3, 4, 5 and then reconsider the type of plan that is to be purchased. The subject innovation enables the end user to press the browser's back button, to reposition at step two 820, select a pre-paid plan, submit the information and move to step five 840. It is to be appreciated that a relationship between step 5 and 2 has not been defined apriori, and hence can exist as an ad hoc relation. Also, the cancel event 860 can be modeled as an event handler on the main State Machine workflow. Accordingly, the subject innovation provides a framework, where relationships can be dynamically created at runtime. Such allows analysts and developers to model only the most common execution path between pages, and the control flow defined on the workflow model to adjust to end-user requests.

Figure 9:
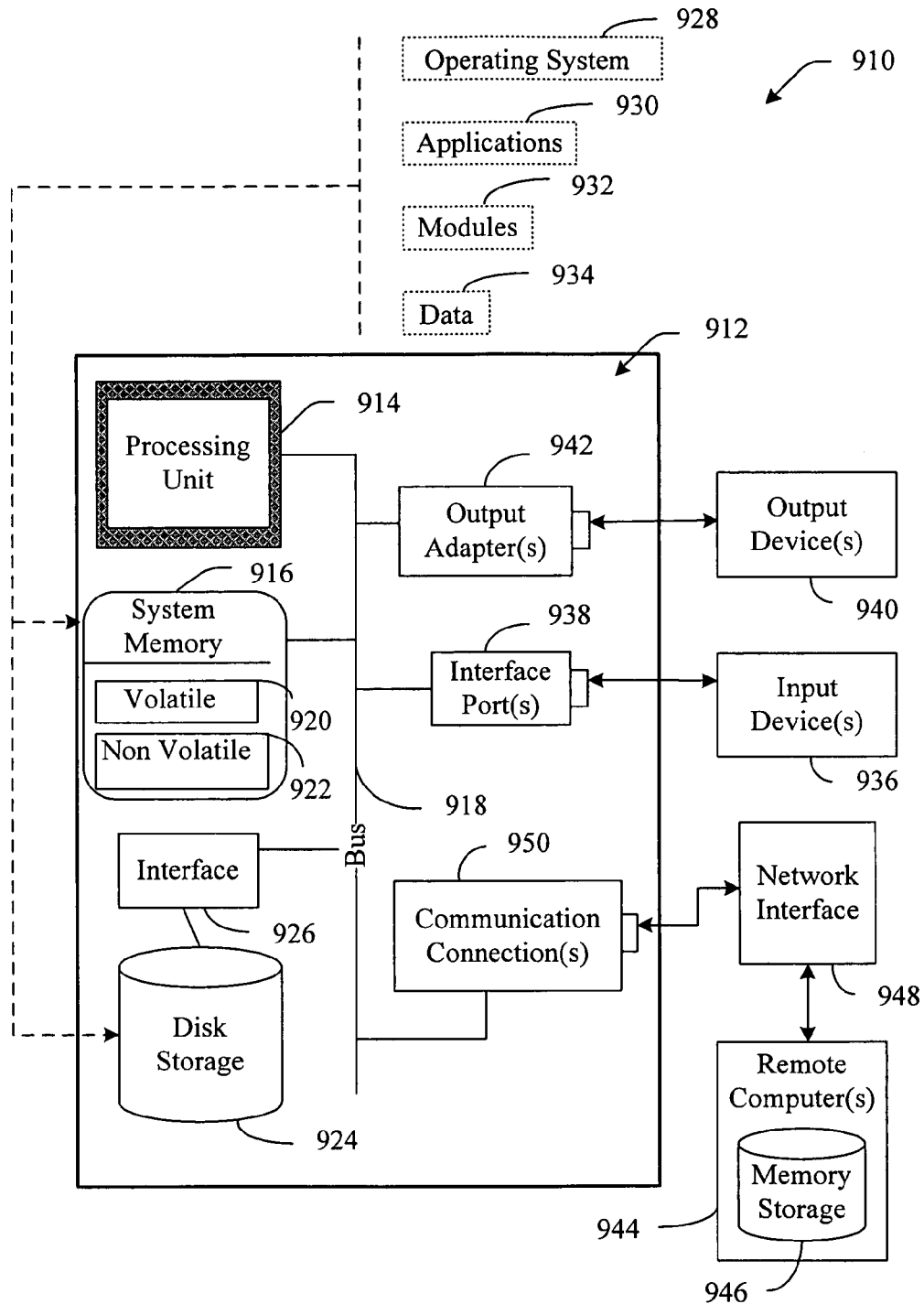
FIG. 9 illustrates an exemplary environment for implementing various aspects of the subject innovation.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
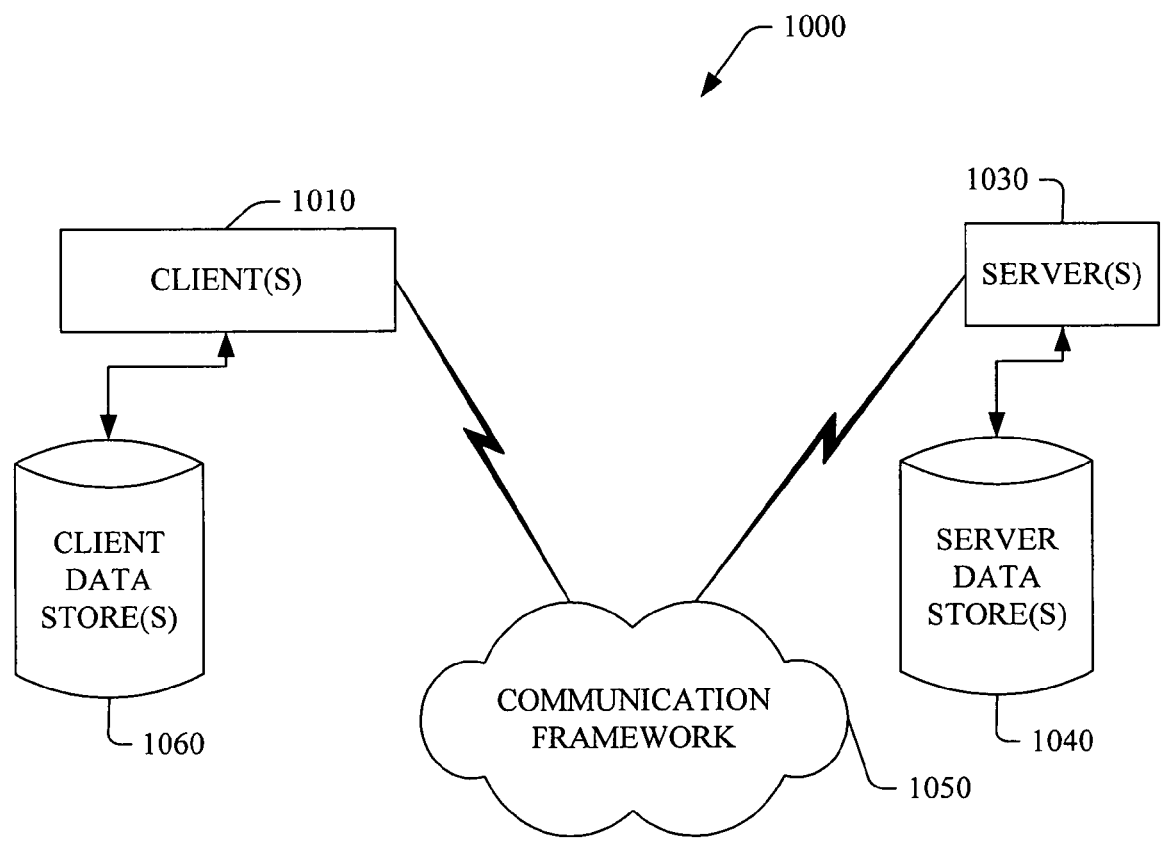
FIG. 10 is a schematic block diagram of an additional-computing environment that can be employed to implement a workflow with routing persistence service of the subject innovation.

FIG. 10 is a schematic block diagram of a sample-computing environment 1000 that can be employed to incorporate a workflow implementation of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
    a computer-readable storage medium having stored thereon computer-executable components, the computer-executable components comprising:
    a workflow provider that provides a workflow, the workflow including a plurality of workflow states and a plurality of web pages corresponding to the plurality of workflow states, the plurality of web pages including:
        a first web page corresponding to a first workflow state of the plurality of workflow states;
        a second web page corresponding to a second workflow state of the plurality of workflow states, the second web page being positioned in the workflow after the first web page, the second workflow state being positioned in the workflow after the first workflow state; and
        at least one intermediate web page corresponding to at least one intermediate workflow state of the plurality of workflow states, the at least one intermediate web page being positioned in the workflow after the first web page and before the second web page, the at least one intermediate workflow state being positioned in the workflow after the first workflow state and before the second workflow state; and
    a dynamic state manager component as part of an engine of the workflow, the dynamic state manager component, in response to a browser browsing from the second web page back to the first web page, creates one or more relationships between the workflow states that have not been modeled as part of the workflow, to enable ad hoc state changes in the workflow at run time;
    the one or more relationships created in response to the browser browsing from the second web page back to the first web page including:
        a relationship between the first web page and the second web page that causes the workflow to, in response to a submission of the first web page, navigate from the first web page to the second web page and skip over the at least one intermediate web page.

2. The computer implemented system of claim 1, wherein the computer-executable components further comprise an interactive activity component that stops the workflow at specific points and awaits an input from a host application that drives the workflow states.

3. The computer implemented system of claim 2, wherein the workflow is associated with an application navigation control displayed in a browser.

4. The computer implemented system of claim 3, wherein there is a one to one association between each display and each state.

5. The computer implemented system of claim 4, wherein the computer-executable components further comprise navigation paths that are supplied by the host.

6. The computer implemented system of claim 5, wherein the navigation paths having a "go-to" form.

7. The computer implemented system of claim 5, wherein the events correspond to user interfaces.

8. The computer implemented system of claim 5, wherein the events are ad hoc events not modeled as part of the workflow logic.

* * * * *